United States Patent Office 3,441,324
Patented Apr. 29, 1969

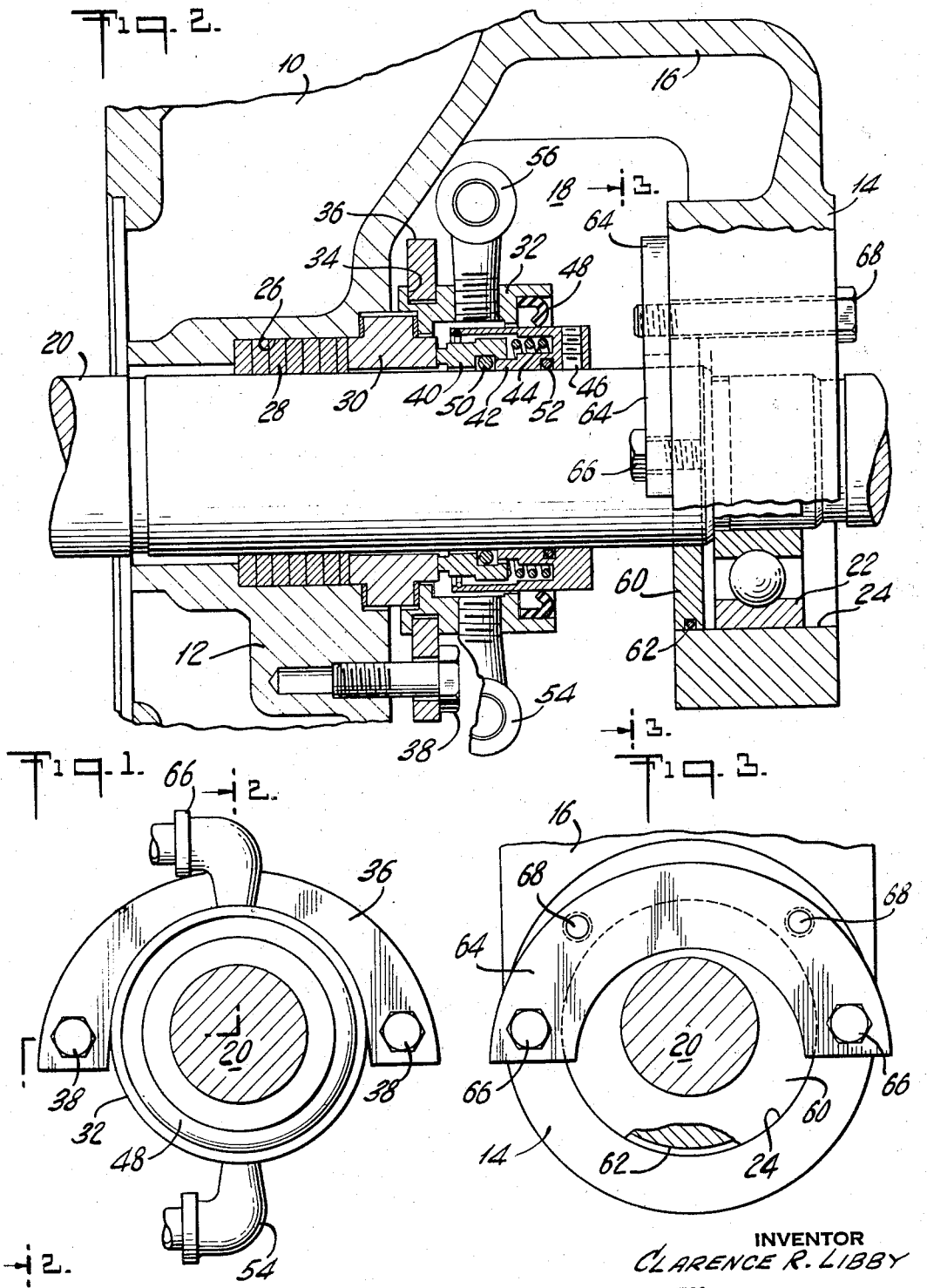

3,441,324
HOUSING FOR A SEALED ROTATING SHAFT
Clarence R. Libby, Norwalk, Conn., assignor to Nash Engineering Company, South Norwalk, Conn., a corporation of Connecticut
Filed June 22, 1967, Ser. No. 648,042
Int. Cl. F16c 33/76; F16j 15/16, 15/54
U.S. Cl. 308—36.1              14 Claims

ABSTRACT OF THE DISCLOSURE

An auxiliary bearing housing is provided integral with the main housing through which a rotating shaft passes. The shaft is journaled in the auxiliary housing and sealing means are provided about the shaft to prevent fluid leakage. The auxiliary housing is spaced from the main housing to define a manipulation area therebetween. The sealing elements for the shaft are secured thereto by means of a clamp member that is radially removable within the manipulation space. All of the sealing elements may be removed axially from the bearing opening in the auxiliary housing.

---

The present invention relates generally to housings for sealed rotatable shafts and more particularly to an improved housing having an auxiliary member spaced therefrom to rotatably support the shaft to be sealed whereby the clamp member for the shaft seal may be manipulated between the housings and the shaft sealing elements removed through the auxiliary housing.

The shaft seals used for a rotary vacuum pump for example, have to be quenched, and for this reason the shafts are usually provided with a quench liquid inlet pipe, an overflow pipe, a quench liquid rotary seal, etc. In the past the assembly and disassembly of the conventional sealed parts has been very difficult and frequently has required the disassembly of the entire pump in order to remove and replace the shaft seals.

It is therefore a primary object of this invention to provide an improved housing to facilitate assembly and removal of the shaft seal, for example, when repairs are required.

It is another object of this invention to provide an improved housing, for example, for a pump, whereby the shaft sealing members may be axially removed without disassembling the entire pump.

Yet another object of this invention is to provide an improved housing, as discussed above, wherein an auxiliary housing is spaced from but is integral with the main housing to rotatably support the pump shaft.

A further object of this invention is to provide a bearing housing spaced from the main housing to define a manipulation area therebetween thereby facilitating removal and assembling of the shaft sealing means.

A particular object of the present invention is to provide an improved pump housing wherein removable clamp means are utilized to secure axially removable shaft sealing means, the clamp means being radially movable within a manipulation space defined by the main housing and axially spaced shaft bearing housing integral therewith.

Still another object of this invention is to provide a housing as described above wherein all of the shaft sealing means are axially removable through the auxiliary bearing housing.

These and other objects, features and advantages of the invention will, in part, be pointed out with particularity and will, in part, become obvious from the following more detailed description of the invention, taken in conjunction with the accompanying drawing, which forms an integral part thereof.

In the various figures of the drawing, like reference characters designate like parts.

In the drawing:

FIG. 1 is a transverse sectional view a preferred form of this invention showing the relationship of the radially removable clamp for the shaft sealing means;

FIG. 2 is an enlarged sectional side elevational view taken along line 2—2 of FIG. 1 illustrating the improved housing utilized with a conventional shaft seal assembly; and FIG. 3 is a transverse sectional view similar in orientation to FIG. 1 and on the same scale but taken along line 3—3 of FIG. 2.

Referring now to the drawing, the housing 10 is comprised of an end wall 12 that is fragmentarily shown. In accordance with this invention the housing 10 is also provided with an auxiliary housing 14 that is coupled thereto by means of a web 16. The confronting walls of the main housing and the auxiliary housing together with the web 16 define a manipulation space 18. Shaft 20 passes through end wall 12 of housing 10 is journaled in auxiliary housing 14 by means of bearing 22 located within an opening 24 of the auxiliary housing. Chamber 26 in the end wall 12 of the main housing defines a shaft sealing space wherein, for illustrative purposes, there is shown a packing gland 28. It is to be understood, however, that other shaft seals such as a rotating member may also be utilized for this purpose.

A seal ring 30 is disposed about the shaft and is contained within wall 12 in opposition to the chamber 26. Gland member 32 is disposed about the seal ring 30 and a portion of shaft 20. As shown particularly in FIG. 2, gland member 32 is provided with a circumferential groove 34 in which is seated a horseshoe-shaped clamp 36. Bolts 38 removably secure the horseshoe-shaped clamp to end wall 12 of housing 10.

The remainder of the shaft sealing element comprise a rotating seal ring 40 that is in abutment with member 30, a housing 42 supporting the seal ring 40 and a compression spring 44 urging seal ring 40 into face-to-face engagement with member 30. Housing 42 may be secured to shaft 20 by means of set screw 46. A lip seal 48 is disposed between member 32 and drive housing 40. In addition, a first O-ring 50 may be provided between member 40 and the shaft 20 and a second O-ring 52 may be provided between the housing 40. In addition, a first O-ring 50 may be provided between member 40 and the shaft 20 and a second O-ring 52 may be provided between the housing 42 and the shaft 20.

In order to provide fluid for the sealing members, pipes 54 and 56 are threaded into member 32. The quench liquid pipe system and the configuration of the horseshoe clamp 36 is shown in greater detail in FIGS. 1 and 2. Pipe 54 provides for the input of liquid while the opposite pipe 56 is an overflow pipe adapted to drain the liquid.

The sealing face between members 30 and 40 is the principal sealing face and is intended to avoid leakage of liquid along the shaft and radially outward to the quenching chamber. O-ring 50 is intended to avoid leakage in the same direction. Lip seal 48 and O-ring 52 is utilized to prevent leakage of the quenching liquid to the outside.

Referring once again to FIG. 2 and also to FIG. 3, it will be seen that the bearing 22 is provided with an end cap 60 that is in the form of a disc having an O-ring 62 bearing against the inside diameter of opening 24. The cap is secured to a second clamp member 64 by means of screws 66 and the clamp member is in turn secured to the auxiliary housing 14 by means of bolts 68. Clamp member 64 extends only a little more than half way around the shaft and is removable therefrom in a radial direction. Clamp member 64 is substantially the same in structure and function as clamp 36.

When it is necessary to remove the shaft seals, bolts 68 are threaded out of clamp 64. Bolts 66 are then removed from end cap 62 to permit axial removal of the bearing 22 and end cap 62 through opening 24. The clamp member may then be removed in a radial direction within manipulation space 18. In a like manner, bolts 38 are threaded out of wall 12 so that with respect to the shaft clamp member 36 may also be moved in a radial direction within the manipulation space 18. Pipes 54 and 56 are also threaded out of member 32, if necessary utilizing the manipulation space for this purpose. It should be noted that bearing opening 24 is at least as large and is preferably slightly larger than the outside diameter or largest dimension of member 32. Therefore, with clamps 36 and 64 and pipes 54 and 56 removed by radial movement within the manipulation space, it will be seen that all of the sealing elements as well as the bearing and end cap therefor may now be moved axially through bearing opening 24. Accordingly, it is not necessary to disassemble the pump merely to change the sealing elements. It is of course to be understood that the same elements may be assembled in the reverse manner. That is, the sealing elements may be inserted through bearing opening 24 and clamped in place by the bolts described above. The pipes may then be threaded into place as required.

There has been disclosed heretofore the best embodiment of the invention presently contemplated. It is to be understood, however, that various changes and modifications may be made by those skilled in the art without departing from the spirit of the invention.

What is claimed is:

1. In a device having a rotating shaft and sealing elements associated therewith, an improved housing and shaft seal retaining means comprising, in combination:
    (a) a main housing having at least one wall through which the shaft extends, the sealing elements being removably disposed about the shaft and in proximity to said main housing wall;
    (b) an auxiliary housing spaced from said main housing and having an opening and a bearing assembly in said opening in which the shaft is rotatably journalled;
    (c) connection means joining said main housing and said auxiliary housing to define a manipulation space therebetween; and
    (d) first removable retaining means including fastening means for securing at least one of the sealing elements to said main housing wall, said first removable retaining means extending only partly around the sealing elements and being radially removable therefrom, second removable retaining means for retaining said bearing assembly in said opening, said first removable retaining means being removably positioned within said manipulation space whereby the sealing elements are axially removable through the opening in said auxiliary housing without removal of the shaft when said second removable retaining means and said bearing assembly are removed from said auxiliary housing.

2. The structure in accordance with claim 1, wherein said first removable retaining means is a horseshoe-shaped clamp having a portion thereof in abutting engagement with one of the sealing elements.

3. The structure in accordance with claim 1, wherein the shaft is rotatably supported in said bearing assembly having an end cap disposed in the opening in said auxiliary housing, said structure including said second removable retaining means securing the end cap to said auxiliary housing, and forming said end cap retaining means whereby the bearing and end cap are axially removable through the opening in said auxiliary housing.

4. The structure in accordance with claim 3, wherein said end cap retaining means extends only partly around the shaft and is radially removable therefrom.

5. The structure in accordance with claim 3, including fastener means removably securing said end cap retainer means to said auxiliary housing and fastener means removably securing said end cap retainer means to the end cap.

6. A seal assembly for a device having a shaft, said seal assembly, comprising, in combination:
    (a) a main housing having said shaft extending therethrough;
    (b) an auxiliary housing spaced from the main housing and provided with an opening having a bearing assembly therein and rotatably supporting the shaft within said bearing assembly;
    (c) connection means joining the main housing and said auxiliary housing to define a manipulation space therebetween;
    (d) sealing means disposed about the shaft, said sealing means being smaller than the opening in said auxiliary housing; and
    (e) first removable retaining means including fastening means securing at least a portion of said sealing means to the wall of the main housing, said retaining means surrounding substantially one-half of the outer circumference of said sealing means, and second removable retaining means for retaining said bearing assembly in said opening, said first removable retaining means being removably positioned within said manipulation space whereby said sealing means are axially removable through the opening in said auxiliary housing without removal of the shaft when said second removable retaining means and said bearing assembly are removed from said auxiliary housing.

7. The structure in accordance with claim 6, wherein said first removable retaining means is a clamp extending only partly around a portion of said sealing means.

8. The structure in accordance with claim 6, further including:
    (a) an end cap disposed about the shaft in opposition to one end face of said bearing assembly;
    (b) said second removable retaining means being removably disposed in said manipulation space whereby said bearing assembly and said end cap are axially removable through the opening in said auxiliary housing; and
    (c) fastener means removably securing said second removable retaining means to said auxiliary housing.

9. The structure in accordance with claim 8, wherein said second removable retaining means is a clamp extending only partly around the shaft and is axially removable therefrom.

10. The structure in accordance with claim 7, wherein the outer surface of said sealing means includes means preventing axial movement of said clamp.

11. The structure in accordance with claim 10 wherein said means to prevent axial movement of said clamp comprises at least one radial wall.

12. The structure in accordance with claim 10, wherein said means to prevent axial movement of said clamp comprises a reduced diameter bounded by spaced, radial walls.

13. The structure in accordance with claim 6, including conduit means removably connected to said sealing means for delivering a quenching liquid thereto, said conduit means being radially removable within said manipulation space.

14. The structure in accordance with claim 13, including second conduit means removably connected to said sealing means for removing quenching liquid therefrom, said second conduit means being radially removable within said manipulation space.

References Cited
UNITED STATES PATENTS 2,638,364  5/1953  Rechtin _____ 308—187.1

EDGAR W. GEOGHEGAN, *Primary Examiner.*

FRANK SUSKO, *Assistant Examiner.*

UNITED STATES PATENT OFFICE
CERTIFICATE OF CORRECTION

Patent No. 3,441,324              Dated Apr. 29, 1969

Inventor(s) Clarence R. Libby

It is certified that error appears in the above-identified patent and that said Letters Patent are hereby corrected as shown below:

Numeral 66 in Fig. 1 should read 56.

SIGNED AND SEALED
FEB 9 1971

(SEAL)
Attest:

Edward M. Fletcher, Jr.
Attesting Officer

WILLIAM E. SCHUYLER, JR.
Commissioner of Patents